United States Patent [19]

Lewis

[11] Patent Number: 4,801,831
[45] Date of Patent: Jan. 31, 1989

[54] ELECTRIC MOTOR STATOR SUPPORT STRUCTURE AND METHOD OF MANUFACTURING SAME

[75] Inventor: John G. Lewis, St. Louis, Mo.
[73] Assignee: Emerson Electric Co., St. Louis, Mo.
[21] Appl. No.: 10,180
[22] Filed: Feb. 2, 1987
[51] Int. Cl.[4] .............................................. H02K 5/00
[52] U.S. Cl. ........................................ 310/91; 310/42; 310/89; 310/217; 310/258
[58] Field of Search ............... 310/42, 89, 91, 216, 310/217, 254, 258, 259; 29/596, 732, 736; 336/210

[56] References Cited

U.S. PATENT DOCUMENTS

| | | | |
|---|---|---|---|
| 3,382,573 | 5/1968 | Mantelet | 310/216 |
| 3,688,138 | 8/1972 | Jacyno | 310/89 |
| 4,473,764 | 9/1984 | White | 310/254 |
| 4,480,378 | 11/1984 | White | 29/596 |
| 4,521,953 | 6/1985 | King | 29/732 |
| 4,549,346 | 10/1985 | White | 29/596 |
| 4,557,041 | 12/1985 | White | 29/732 |
| 4,712,292 | 12/1987 | King | 29/596 |

FOREIGN PATENT DOCUMENTS

| | | | |
|---|---|---|---|
| 0851655 | 10/1952 | Fed. Rep. of Germany | 310/217 |
| 1962085 | 6/1971 | Fed. Rep. of Germany | 310/91 |
| 1100589 | 1/1968 | United Kingdom | 310/217 |

Primary Examiner—R. Skudy
Attorney, Agent, or Firm—Polster Polster and Lucchesi

[57] ABSTRACT

An improved electric motor stator support structure and method of manufacture wherein laminations forming the stator are arranged to provide peripherally spaced tongue members extending laterally relative the peripheral sides of the stator, the tongue members engaging with slots in support means connecting spaced end shields of the motor.

11 Claims, 3 Drawing Sheets

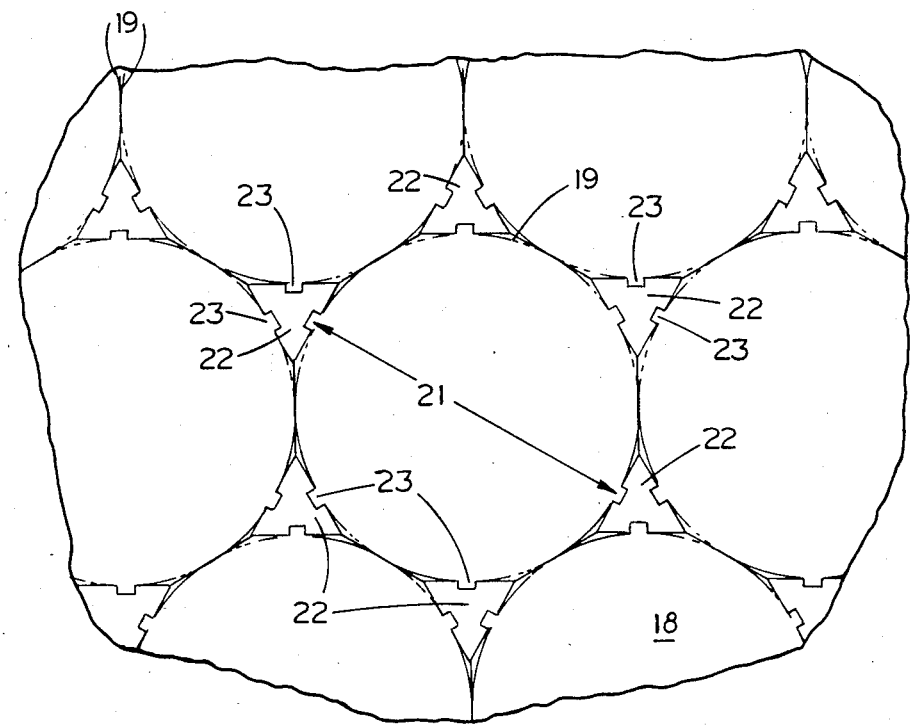
FIG. 3
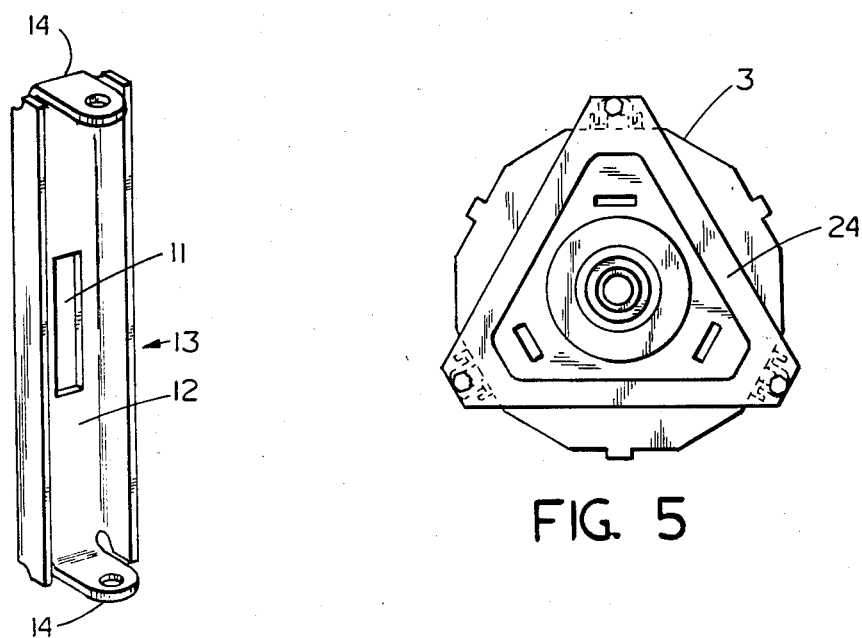
FIG. 2
FIG. 5

ELECTRIC MOTOR STATOR SUPPORT STRUCTURE AND METHOD OF MANUFACTURING SAME

BACKGROUND OF THE INVENTION

The present invention relates to electric motors and more particularly to a unique, improved stator support assembly for an electric motor and a method of manufacture and assembly of the same.

In the electric motor art it has been well known to support spaced motor end shields from the motor stator either by fastening the end shields with appropriate spacer supports to opposed faces of the stator or by passing support members directly through bore holes in the stator, fastening the stator to the support members intermediate their extremities and fastening end shields to the support member extremities. More recently, as disclosed in U.S. Pat. No. 4,473,764, issued to Robert W. White on Sept. 25, 1984 and in subsequent U.S. Pat. Nos. 4,480,378, also issued to Robert W. White on Nov. 6, 1984; No. 4,521,953, issued to James L. King et al on June 11, 1985; and, No. 4,557,041, issued to Robert W. White on Dec. 10, 1985, electric motor assemblies have utilized support members or beam sets secured intermediate their extremities in peripheral slots of a stator, the extremities of the support members passing through apertures in opposed end plates and welded into place.

For the most part, these past assemblies have been comparatively complex and expensive in manufacture and assembly, requiring a multiplicity of assembly steps, a substantial waste of material and often leading to undesirable stresses, alignment problems and assembly discrepancies.

In accordance with the present invention, a unique electric motor structure and method of manufacturing and assembling the same is provided, particularly in the core section thereof, which permits for ready, economical and straightforward manufacture and assembly with a minimum of material wastage and assembly discrepancies without sacrificing parts alignment and motor assembly stability. Various other features of the unique apparatus and method of the present invention will become obvious to one skilled in the art upon reading the disclosure herein.

SUMMARY OF THE INVENTION

More particularly, the present invention provides an improved electric motor structure comprising: a stator and rotor assembly, the rotor being rotatably disposed with reference to the stator and having a rotor shaft extending therefrom; a pair of spaced end shields for rotatably journalling the rotor shaft relative the stator; and longitudinally extending support means connected to and extending from the spaced end shields to maintain the end shields in spaced relation relative the stator; the stator and the support means including spaced nesting tongue and slot means cooperably positioned in directly opposed facing relation between and intermediate the longitudinal edges of the longitudinally extending support means and stator, the tongue means extending laterally relative the peripheral sides of the stator to independently and interfittingly engage with the slot means with the stator supported intermediate the spaced end shields. In addition, the present invention provides a unique arrangement for attaching the support means to the spaced end shields with a minimum of operational steps and stress factors. Further, the present invention provides an improved and efficient method for manufacturing a stator for an electric motor and assembling the same, such method comprising: forming a pattern on a sheet of preselected material from which stator laminations are to be separated, the pattern including at least two abutting rows of abutting circles each preselectively sized to define the active material diameter and confine the main body of a lamination with adjacent rows of abutting circles being staggered so that peripheries of the adjacent rows of circles substantially dovetail in spaces defined between opposed mirror image arcs of adjacent circles in an adjacent row with peripheries of circles of one row abutting peripheries of two circles of an adjacent row of circles to maximize material usage between circles; separating laminations of preselected shape from the confines of the circles defining the active material diameter of the laminations; and stacking a preselected number of separated laminations to form the basic stator. In addition, the present invention provides a novel method of stacking the laminations to form a stator and to assemble the stator in position intermediate spaced end shields.

It is to be understood that various changes can be made by one skilled in the art in the several parts of the novel structure and the several steps of the novel method disclosed herein without departing from the scope or spirit of the present invention.

BRIEF DESCRIPTION OF THE DRAWINGS

Referring to the drawings which disclose an advantageous embodiment of the present invention and possible modifications thereof;

FIG. 2 is an enlarged isometric view of one of the channel shaped support members of FIG. 1;

FIG. 3 is a top plan view of a portion of a sheet of material disclosing the pattern of the abutting rows of abutting circles as utilized in accordance with the novel method of manufacturing laminations for the stator of the inventive motor assembly;

FIG. 5 is a top plan view of a modified assembly utilizing three support members and opposed triangularly shaped end shields; and, FIG. 6 is an exploded isometric view of another modified assembly disclosing a modified end shield including support means integral with the end shield and connected to the stator.

DETAILED DESCRIPTION OF THE DRAWINGS

Figure 1:
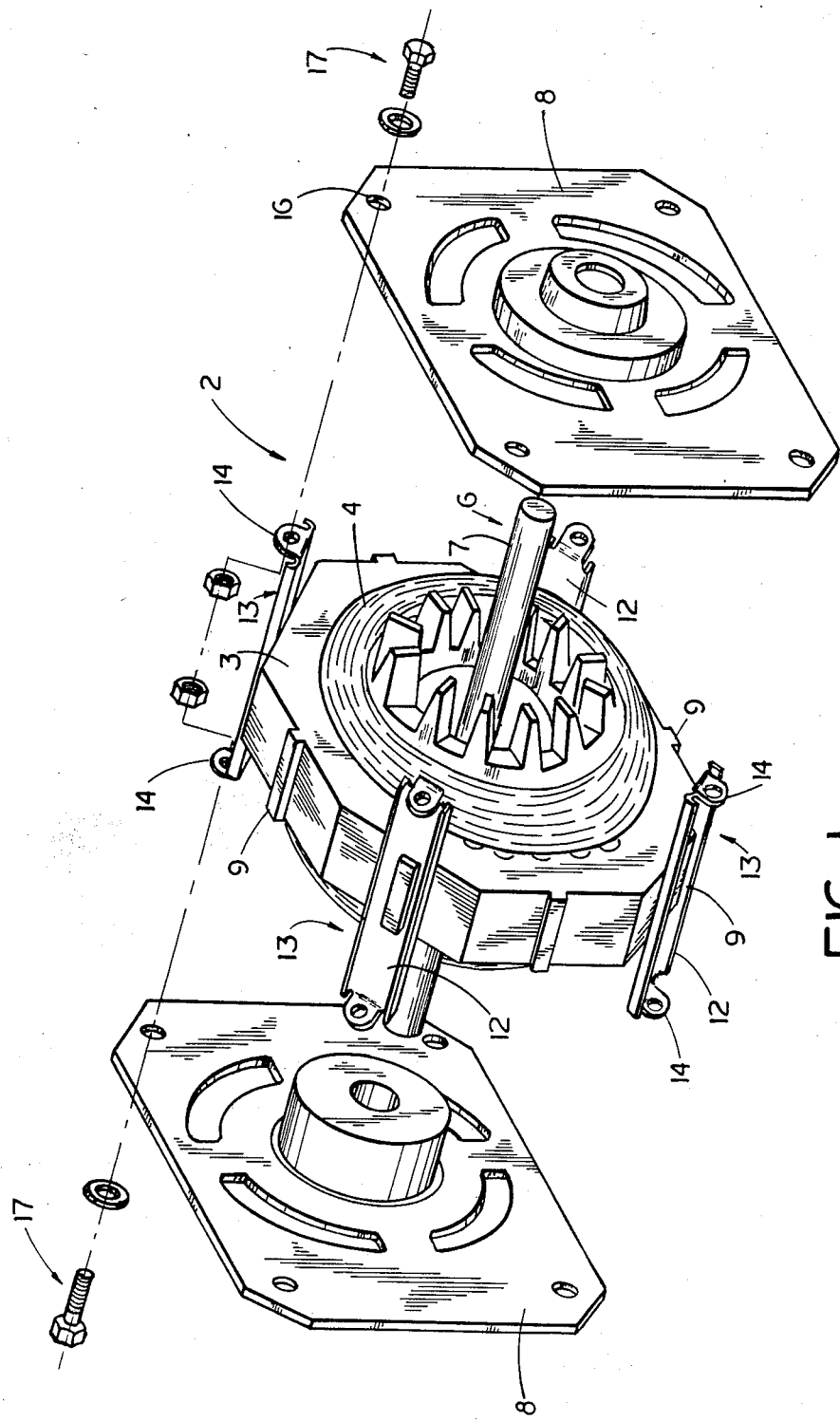
FIG. 1 is an exploded isometric view of the inventive motor assembly disclosing four tongue members of a stator in engagement with longitudinally extending slots of a set of four channel shaped support members with the extremities of the support members positioned to be fastened at the corners to the inner faces of opposed rectangularly shaped end shields.

As can be seen in FIG. 1, the inventive electric motor assembly 2 includes a stator 3 comprised of a plurality of stacked laminations (the inventive structural and manufacturing details of which will be described hereinafter). As is conventional in the electric motor art and therefore not described in detail herein, stator 3 has a central bore and is appropriately slotted to include stator windings 4. Rotatably disposed within the central bore of stator 3 is rotor assembly 6 having a rotor shaft 7, the ends of which are journalled in a pair of spaced opposed rectangularly shaped end shields 8.

In accordance with the present invention, laminated stator 3 as disclosed includes six peripheral sides with each side having an integral longitudinally extending tongue member 9. As will be described in detail hereinafter, tongue members 9 are formed from integral tab members extending in equally spaced relation along the periphery of the laminations, the tab members of stacked laminations being longitudinally aligned to form the peripherally, equally spaced, longitudinally extending tongue members 9.

As disclosed in FIGS. 1 and 2, four of the six tongue members 9 respectively nest in independent and interfitting relation in longitudinally extending, preselectively sized, directly opposed and facing slots 11 formed intermediate the extremities and intermediate the longitudinal edges in each of the base legs 12 of channel members 13. Channel shaped support members 13 generally are of U-shaped cross-section to include longitudinally extending base legs 12 and side legs extending substantially normal from the longitudinal edges thereof for added structural strength and stability. Each longitudinally extending tongue member 9 can be independently press-fitted into a directly opposed, facing slot 11 of a channel shaped support member 13 and, if desired, the longitudinal extremities of each tongue member 9 can be coined or staked (not shown) to insure fast nesting engagement therewith. As will be noted in FIGS. 1 and 2 of the drawings, the base leg 12 of each channel shaped support member 13 has its extremities turned at right angles to provide tabs 14. Tabs 14 are apertured and assembled about the inner face of an adjacent end shield 8 to be fastened thereto at the apertured corners 16 by the threaded bolt, nut and washer assemblies 17, maintaining stator 3 in stable supported position intermediate the pair of spaced opposed end shields 8.

As can be seen in FIG. 3, the improved method for manufacturing laminations for stator 3 includes forming a pattern of stator laminations on a suitable sheet of stator material 18 such as but not limited to a sheet of low carbon steel of 0.025 to 0.030" thickness. The pattern from which the stator laminations are to be separated includes several abutting rows of abutting circles 19, each circle being preselectively sized to define the active material diameter 21 of a stator lamination and confine the main body of the stator lamination therein. As can be seen in FIG. 1, the stator lamination main body disclosed is of six equal sides. It is to be understood that other geometries can be used and that circle patterns can be of varied sizes to make several sizes of stators in accordance with demands and to further the optimum usage of stator sheet material. As will be noted in FIG. 3, adjacent rows of abutting circles 19 are staggered so that the peripheries of adjacent rows of circles substantially dovetail in the spaces defined between mirror image arcs of adjacent lamination defining circles of an adjacent row of circles with the peripheries of the circles of one row abutting the peripheries of two adjacent circles of an adjacent row of circles. This serves to maximize usage of material on the sheet of stator material 18 and thus minimize the amount of material 22 between abutting circles. The material 22 between abutting circles 19 serves for the formation of integral tab portions 23 extending from the peripheries of each lamination circle with tabs 23 of each circle being equally spaced from one another along the circle periphery to thus result in tabbed circles being symmetrical for lamination stacking assembly described hereinafter.

Once the circle patterns have been established on sheet 18, the stator laminations of preselected shape can be separated from the confines of circles 19 which define the active material diameter 21 of each circle 19. This can be accomplished by suitable machining operations such as stamping, punching, laser separation or hydraulic separation. The stamping can be accomplished in several steps to permit progressive rounding and minimize sharp edge formation and burring. With the tabbed laminations separated, a preselected number of stamped stator laminations of similar shape can be stacked with adjacent stator laminations being inverted with respect to one another and corresponding tabs 23 of adjacent laminations in the sheet of material 18 being offset radially an amount equal to a multiple of the peripheral distance between tabs but different than 360° so as to minimize burr and lamination thickness discrepancies. The stacked stator laminations as they are assembled can be varnished and heated or otherwise joined in fast face-to-face relation in a manner as known in the art to form novel stator 3 as a unit with peripherally spaced, laterally extending tongues 9. Once the laminated stator 3 has been assembled as a unit, the tongues 9 of the unified stator can be press-fitted into slotted engagement with slots 11 of channel shaped support members 13. As aforenoted, the extremities of tongues 9 can be appropriately coined or staked to provide a fast nesting engagement. The apertures of tabs 14 of channel shaped support members 13 are aligned with the apertured corners 16 of opposed end shields 8 and the assembly firmly connected together by nut, bolt and washer assemblies 17 with stator 3 held intermediate the opposed end shields 8 and the rotor assembly properly journalled in the end shields.

Figure 4:
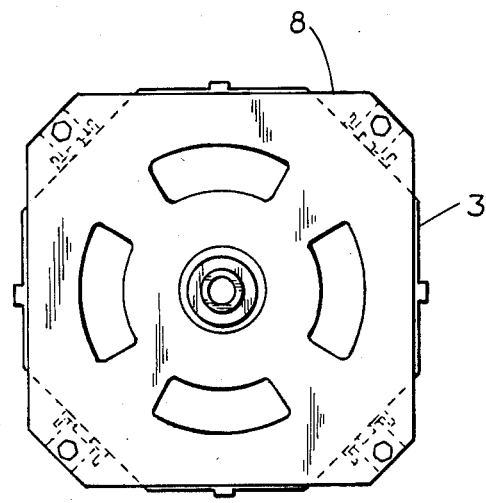
FIG. 4 is a top plan view of the inventive electric motor assembly of FIG. 1.

As can be seen in FIGS. 4 and 5, the same six-sided stator 3 can be utilized with rectangularly shaped opposed end shields 8 or with triangularly shaped opposed end shields 24.

Figure 6:
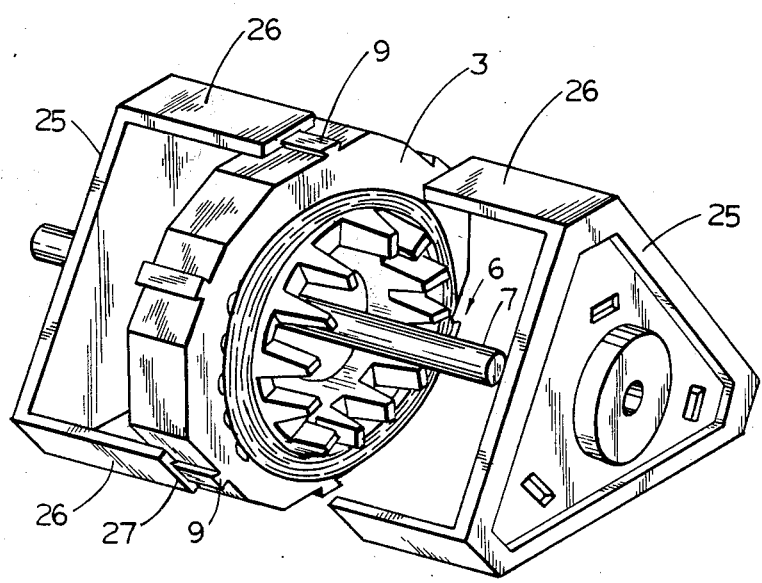

Referring to FIG. 6 of the drawing, a modified arrangement is disclosed wherein modified end shields 25 are disclosed to include integral support means in the form of spaced integral legs 26 extending from the periphery thereof. Legs 26 are each provided with an inwardly facing slot 27 therein to nestingly receive a tongue 9 of stator 3 in a slidable manner therewith and adhesively fixed in place. It is to be understood that the longitudinally extending tongue and slot arrangement need not necessarily extend continuously from one face of the stator to the opposite face but can be interrupted. Accordingly, in the method of manufacture abovedescribed, some of the peripherally extending tabs on the laminations would be omitted.

It is to be understood that other types of support members and geometries can be utilized by one skilled in the art without departing from the scope or spirit of the invention. For example, it would be possible to peripherally space the tabs of the laminations in a different manner, to use laterally extending U-shaped tongue clips which grip holes in the opposite stator faces, to slot the stator and utilize tongues on the support members to nest with such slots, or to form the end shields in cup shape with the inner side walls having spaced, longitudinally extending slots in which the tongues of the stator engage.

The invention claimed is:

1. An improved electric motor structure comprising:

a stator and rotor, said rotor being rotatably disposed with reference to said stator and having a rotor shaft extending therefrom;

a pair of spaced end shields for rotatably journalling said rotor shaft relative said stator; and, longitudinally extending support means connected at opposite ends thereof to and extending from said spaced end shields to maintain said end shields in spaced relation relative said stator;

said stator and said support means including spaced nesting tongue means and slot means comprising a part of and cooperably positioned in directly opposed, facing relation between and intermediate the longitudinal edges of said longitudinally extending support means and said stator, said tongue means extending laterally relative the peripheral sides of said stator to independently and directly interfittingly engage with said directly opposed, facing slot means with the said stator supported intermediate said spaced end shields.

2. The electric motor structure of claim 1, said spaced nesting tongue and slot means and said support means in directly opposed facing relation including peripherally spaced tongue receiving slots extending longitudinally in said support means intermediate said spaced end shields and intermediate the longitudinal edges of said support means and longitudinally extending peripherally spaced tongue members connected to and extending laterally from said stator to be in directly opposed, facing relation with said slots to nest with said set of slots in said support means.

3. The electric motor structure of claim 1, said spaced nesting tongue and slot means and said support means in directly opposed, facing relation including peripherally spaced tongue receiving slots extending longitudinally in said support means intermediate said spaced end shields and intermediate the longitudinal edges of said support means and longitudinally extending peripherally spaced tongue members integral with said stator and extending laterally therefrom to be in directly opposed, facing relation with said slots to nest with said slots in said support means.

4. The electric motor structure of claim 1, said spaced nesting tongue and slot means and said support means in directly opposed, facing relation including peripherally spaced tongue receiving slots extending longitudinally in said support means intermediate said spaced end shields and intermediate the longitudinal edges of said support means and longitudinally extending peripherally spaced tongue members integral with said stator and extending laterally therefrom to be in directly opposed, facing relation with said slots to nest with said set of slots in said support means, said stator including a plurality of stacked laminations at least some of which have integral tab members extending in spaced relation along the periphery thereof with the tab members of stacked laminations being longitudinally aligned to form said peripherally spaced tongue members.

5. The electric motor structure of claim 1, said spaced nesting tongue and slot means in directly opposed, facing relation including tongues and directly opposed, facing correspondingly sized slots, said tongues being press-fit into said directly opposed, facing corresponding slots.

6. The electric motor structure of claim 1, said spaced nesting tongue and slot means in directly opposed, facing relation including tongues and directly opposed, facing correspondingly sized slots, said tongues being staked when in nesting engagement with said corresponding slots.

7. The electric motor structure of claim 1, said support means including a plurality of elongated structural members positioned to extend longitudinally in spaced relation around the periphery of said stator, each elongated structural member having a longitudinally extending slot therein intermediate the longitudinal edges thereof to provide the slots of said spaced nesting tongue and slot means in directly opposed, facing relation.

8. The electric motor structure of claim 1, said support means including a plurality of elongated structural members positioned to extend longitudinally in spaced relation around the periphery of said stator, each elongated structural member having a longitudinally extending slot therein intermediate the longitudinal edges thereof to provide the slots of said directly opposed, facing and nesting tongue and slots means and having its extremities turned to abut an inner face of an adjacent end shield for fastening thereto.

9. The electric motor structure of claim 1, said support means including a plurality of elongated channel members of U-shaped cross-section, each having a base leg and side legs extending therefrom and being positioned to extend longitudinally in spaced relation around the periphery of said stator, the base leg of each channel member having a longitudinally extending slot therein intermediate the longitudinal edges thereof to provide the slots of said directly opposed, facing and nesting tongue and slot means, said base leg of each channel member having its extremities turned at right angles to abut an inner face of an adjacent end shield for fastening thereto.

10. The electric motor structure of claim 1, said support means including a plurality of spaced integral leg members extending from said end shields, each leg member having a longitudinally extending slot therein intermediate the longitudinal edges thereof to provide the slots of said directly opposed, facing and nesting tongue and slot means.

11. An improved electric motor structure comprising:

a stator including a plurality of stacked stator laminations and a rotor, said rotor being rotatably disposed with reference to said stator and having a rotor shaft extending therefrom;

a pair of spaced end shields for rotatably journalling said rotor shaft relative said stator;

a set of elongated longitudinally extending channel members of U-shaped cross-section, each having a base leg and side legs extending therefrom and being positioned to extend longitudinally in spaced relation around the periphery of said stator, the base leg of each channel member having a longitudinally extending preselectively sized slot therein intermediate the longitudinal edges thereof with its extremities turned at right angles to abut an inner face of an adjacent end shield for fastening thereto;

said stator laminations having preselectively sized integral tab members extending in spaced relation along the periphery thereof with the tab members of stacked laminations being longitudinally aligned to form peripherally spaced, longitudinally extending tongue members in directly opposed, facing relation with said slots to be nestable by press-fitting with said longitudinally extending slots of said channel members to maintain said stator in supported position intermediate said spaced end shields.

* * * * *